United States Patent
Keramidas et al.

(10) Patent No.: US 12,481,347 B2
(45) Date of Patent: *Nov. 25, 2025

(54) TECHNIQUES FOR OPTIMIZING NEURAL NETWORKS FOR MEMOIZATION USING SHIFTED VALUE LOCALIZATION

(71) Applicant: Think Silicon Research and Technology Single Member S.A., Rion Achaias (GR)

(72) Inventors: Georgios Keramidas, Patras (GR); Iakovos Stamoulis, Patras (GR)

(73) Assignee: Think Silicon Research and Technology Single Member S.A., Rion Achaias (GR)

(*) Notice: Subject to any disclaimer, the term of this patent is extended or adjusted under 35 U.S.C. 154(b) by 532 days.

This patent is subject to a terminal disclaimer.

(21) Appl. No.: 18/051,263

(22) Filed: Oct. 31, 2022

(65) Prior Publication Data

US 2023/0136786 A1    May 4, 2023

Related U.S. Application Data

(60) Provisional application No. 63/278,747, filed on Nov. 12, 2021.

(51) Int. Cl.
*G06V 10/44*    (2022.01)
*G06F 1/3234*    (2019.01)
(Continued)

(52) U.S. Cl.
CPC .......... *G06F 1/3275* (2013.01); *G06F 9/3832* (2013.01); *G06F 9/3885* (2013.01);
(Continued)

(58) Field of Classification Search
None
See application file for complete search history.

(56) References Cited

U.S. PATENT DOCUMENTS

| 8,656,378 B2 | 2/2014 | Gounares et al. |
| 8,752,034 B2 | 6/2014 | Gounares et al. |

(Continued)

FOREIGN PATENT DOCUMENTS

| CN | 111738403 A | * 10/2020 | ............. G06N 3/045 |
| WO | 2020252762 A1 | 12/2020 | |

OTHER PUBLICATIONS

English translation of CN-111738403-A. (Year: 2020).*
(Continued)

*Primary Examiner* — Thomas D Lee
(74) *Attorney, Agent, or Firm* — M&B IP Analysts, LLC

(57) ABSTRACT

A system and method for increasing cache hits in a value cache utilizing memoization is disclosed. The method includes receiving an input matrix for a parallel processing circuitry, wherein the parallel processing circuitry configured to process the input matrix with a second matrix; selecting a portion of the input matrix, wherein the portion includes a plurality of values; adjusting a first value of the plurality of values based on a second value of the plurality of values; generating a new input matrix based on the input matrix and the adjusted first value; and configuring the parallel processing circuitry to process the new input matrix with the second matrix.

23 Claims, 7 Drawing Sheets

(51) Int. Cl.

| | |
|---|---|
| *G06F 9/38* | (2018.01) |
| *G06F 12/0808* | (2016.01) |
| *G06F 12/0813* | (2016.01) |
| *G06F 12/0875* | (2016.01) |
| *G06F 12/0877* | (2016.01) |
| *G06F 17/16* | (2006.01) |
| *G06N 3/10* | (2006.01) |

(52) U.S. Cl.
CPC ...... *G06F 12/0808* (2013.01); *G06F 12/0813* (2013.01); *G06F 12/0875* (2013.01); *G06F 12/0877* (2013.01); *G06F 17/16* (2013.01); *G06N 3/10* (2013.01); *G06V 10/454* (2022.01)

(56) References Cited

U.S. PATENT DOCUMENTS

| | | |
|---|---|---|
| 9,110,814 B2 | 8/2015 | Keramidas et al. |
| 2015/0347139 A1 | 12/2015 | Keramidas et al. |
| 2018/0025092 A1 | 1/2018 | Aharonov et al. |
| 2020/0220851 A1 | 7/2020 | Storm et al. |
| 2022/0237116 A1 | 7/2022 | Hood et al. |
| 2023/0195419 A1 | 6/2023 | Gope et al. |

OTHER PUBLICATIONS

International Search Report for PCT Application No. PCT/IB2022/060310 dated Jan. 31, 2023. The International Bureau of WIPO.
Written Opinion of the International Searching Authority for PCT Application No. PCT/IB2022/060310 dated Jan. 31, 2023. The International Bureau of WIPO.
International Search Report for PCT Application No. PCT/IB2022/060419 dated Jan. 4, 2023. The International Bureau of WIPO.
International Search Report for PCT Application No. PCT/IB2022/060420 dated Mar. 2, 2023. The International Bureau of WIPO.
Sandhupatla Amruth: "Faster convolutional neural network training via approximate memoization", Oct. 18, 2018, XP093010822.
Seongmin Hong et al.: "Enabling Energy Efficient Image Encryption using Approximate Memoization", Journal of Semiconductor Technology and Science, Jan. 1, 2017, pp. 465-472, XP055680555 DOI: 10.5573/JSTS.2017.17.3.465.
Written Opinion of the International Searching Authority for PCT Application No. PCT/IB2022/060419 dated Jan. 4, 2023. The International Bureau of WIPO.
Written Opinion of the International Searching Authority for PCT Application No. PCT/IB2022/060420 dated Mar. 2, 2023. The International Bureau of WIPO.

* cited by examiner

TECHNIQUES FOR OPTIMIZING NEURAL NETWORKS FOR MEMOIZATION USING SHIFTED VALUE LOCALIZATION

CROSS-REFERENCE TO RELATED APPLICATIONS

This application claims the benefit of U.S. Provisional Application No. 63/278,747 filed on Nov. 12, 2021, and of EP Patent No. 21386065.3 filed on Oct. 29, 2021, all contents of which are hereby incorporated by reference.

All of the applications referenced above are hereby incorporated by reference.

TECHNICAL FIELD

The present disclosure relates generally to neural networks, and specifically to improved techniques for processing neural network on parallel processors.

BACKGROUND

Artificial intelligence is a computing field which has been gaining momentum in the past few years as an increasingly larger number of applications is found, together with supporting hardware. Though a field originally with groundwork laid decades ago, only recent advances in hardware, and software provisioning said hardware, have allowed artificial intelligence to tackle a host of applications.

However ubiquitous artificial intelligence seems, there are still hurdles in adoption of the different technologies under this umbrella term. Neural networks, as one example, require training data, and a substantial use of compute resources such as memory and processing circuitry. Such substantial requirements impedes adoption of neural network solutions, for example on edge devices where power and memory are often conserved as much as possible.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for increasing cache hits in a value cache utilizing memoization. The method comprises: receiving an input matrix for a parallel processing circuitry, wherein the parallel processing circuitry configured to process the input matrix with a second matrix; selecting a portion of the input matrix, wherein the portion includes a plurality of values; adjusting a first value of the plurality of values based on a second value of the plurality of values; generating a new input matrix based on the input matrix and the adjusted first value; and configuring the parallel processing circuitry to process the new input matrix with the second matrix.

Certain embodiments disclosed herein also include a non-transitory computer readable medium having stored thereon causing a processing circuitry to execute a process, the process comprising: receiving an input matrix for a parallel processing circuitry, wherein the parallel processing circuitry configured to process the input matrix with a second matrix; selecting a portion of the input matrix, wherein the portion includes a plurality of values; adjusting a first value of the plurality of values based on a second value of the plurality of values; generating a new input matrix based on the input matrix and the adjusted first value; and configuring the parallel processing circuitry to process the new input matrix with the second matrix.

Certain embodiments disclosed herein also include a system for increasing cache hits in a value cache utilizing memoization. The system comprises: a processing circuitry; and a memory, the memory containing instructions that, when executed by the processing circuitry, configure the system to: receive an input matrix for a parallel processing circuitry, wherein the parallel processing circuitry configured to process the input matrix with a second matrix; select a portion of the input matrix, wherein the portion includes a plurality of values; adjust a first value of the plurality of values based on a second value of the plurality of values; generate a new input matrix based on the input matrix and the adjusted first value; and configure the parallel processing circuitry to process the new input matrix with the second matrix.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
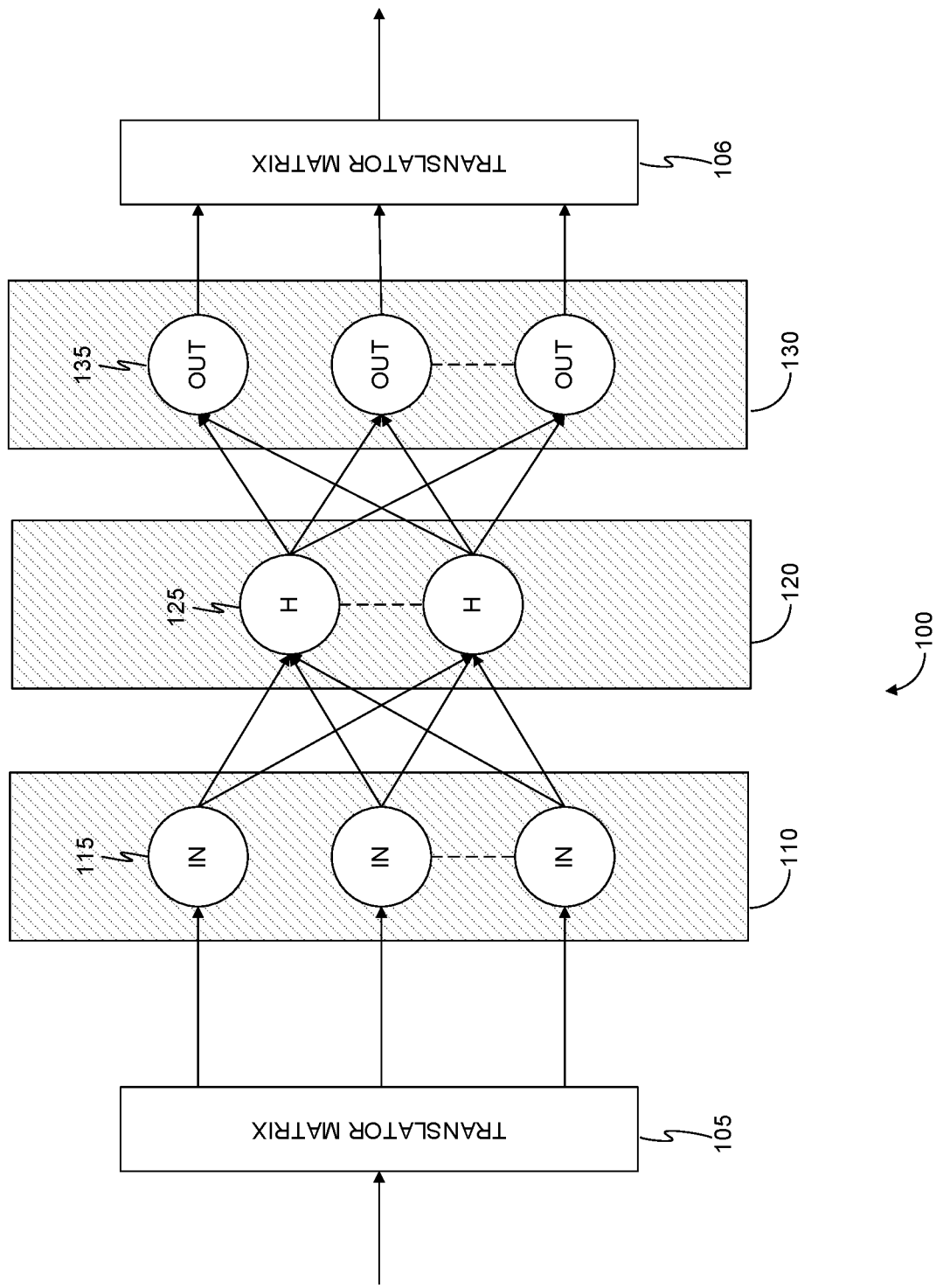
FIG. 1 is a schematic diagram of a neural network (NN) implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for improved processing of neural networks utilizing memoization techniques. In processing a neural network, and specifically convolutional neural networks (CNNs), locality of values may be taken advantage of in order to reduce processing operations, thereby reducing power consumption by a processing circuitry. Specifically, memoization is utilized in order to store in a value cache input and output values which pertain to cacheable instruction blocks which are identified in the neural network model. CNNs perform convolutions, which are multiplication operations that are repeated, on images which tend to have value localization, meaning that for any selected pixel, there is a high probability that the pixels in its vicinity share similar values. Therefore, when processing an image through a CNN, for example during training, many processing operations are performed redundantly. It is therefore advantageous to store the inputs and outputs of such operations in a value cache and retrieve them from the value cache when there is a hit, when the power consumption of retrieving a value from the value cache is lower than the power consumption required by a processing circuitry to execute the cacheable instruction block based on the provided input.

Memoization techniques are disclosed which allow a system to efficiently process artificial intelligence neural networks. Code of a neural network model is received and parsed to detect cacheable blocks of instructions. A cacheable block of instructions includes an input and an output which are predefined, and does not include control instructions. In some embodiments, cacheability may be determined based on the similarity of certain inputs, certain corresponding outputs, or a combination thereof. For example, a least significant bit (LSB) is dropped in an embodiment for certain inputs if their corresponding outputs are close to one another, for example within a predetermined threshold. In an embodiment, a plurality of least significant bits are dropped. Dropping an LSB trades accuracy (i.e., calculation accuracy by a processing circuitry) for conservation of memory space, and in an embodiment is adjusted based on the application of the neural network.

In certain embodiments, a kernel, convolutional layer, fully connected layer, and the like, are represented as a matrix including a plurality of values. According to an embodiment, values of the kernel, convolutional layer, fully connected layer, and the like, are adjusted so as to increase the number of neighboring values which are identical. This increases the probability that a value cache hit occurs, as it takes advantage of inputs having value locality, such as with image representation. The increase in value cache hits allows reducing the amount of processing required, as power-costly multiplications are avoided.

FIG. 1 is a schematic diagram of a neural network (NN) 100 implemented in accordance with an embodiment. The neural network 100 is, in an embodiment, an artificial neural network (ANN), such a recursive neural network (RNN), a convolution neural network (CNN), and the like.

In an embodiment, the neural network 100 includes an input numerical translator matrix 105. The input numerical translator matrix 105 is configured to receive an input and translate the input to a numerical representation. In an embodiment, the input is an alphanumeric representation. In certain embodiments, the numerical representation is a binary representation. In an embodiment the numerical representation is provided as input to an input neuron 115 of the neural network 100. An input neuron 115 is a function, for example defined by computer code, which provides an output based on a received input.

In an embodiment, the input numerical translator matrix 105 is configured to receive an input which includes a plurality of elements. For example, each element of the plurality of elements is represented by an alphanumeric string, in an embodiment. In certain embodiments, each element is mapped by an injective function to a unique numerical representation. For example, an red green blue (RGB) value which is represented using a hexadecimal representation is mapped to a unique binary value.

In an embodiment an input from the translation matrix 105 is provided to an input neuron 115, which is one of a plurality of input neurons, the plurality of input neurons together forming an input layer 110 of the neural network 100. In an embodiment, the input layer 110 includes neurons which receive an external input, i.e., an input which is not an output of another neuron of the neural network 100. In certain embodiments, the input layer 110 includes neurons which receive both the external input and an internal input Each neuron (also referred to as a node) of the neural network 100 is configured to apply a function to its input and to send the output of the function forward (e.g., to another neuron). Each neuron may include a weight function. A weight function of a neuron determines the amount of contribution a single neuron has on the eventual output of the neural network. The higher a weight value used by the weight function is, the greater the effect that the neuron's computation carries on the output of the neural network.

The neural network 100 further includes a plurality of hidden neurons 125 in a hidden layer 120. In this example embodiment, a single hidden layer 120 is shown, however a plurality of hidden layers may be implemented without departing from the scope of the disclosed embodiments.

In an embodiment, the neural network 100 is configured such that each output of an input neuron 115 of the input layer 110 is used as an input to one or more hidden neurons 125 in the hidden layer 120. In an embodiment, each output of the input neurons 115 is used as an input to all of the hidden neurons 125 of the hidden layer 120. In embodiments where multiple hidden layers are implemented, the output of the input layer 110 is used as the input for the hidden neurons of a first hidden layer among the multiple hidden layers. In certain embodiments, some input neurons may output to only some of the hidden layer nodes, while other input neurons provide their output to some other hidden layer nodes.

In certain embodiments, the neural network 110, such as a CNN, is configured to include a plurality of convolutional layers. A convolutional layer includes a filter, which is represented as a matrix. The filter is applied on an input, which produces a dot product, also known as an activation map. In certain embodiments, the plurality of convolutional layers are partially interconnected, to provide local connectivity, rather than fully interconnected. Full connectivity between convolutional layers is not practical due to the amount of memory required to store such connections. Furthermore, for certain application, such as image recognition, full connectivity would not take advantage of the fact that image data is typically spatially local.

The neural network 100 further includes an output layer 130, which includes one or more output neurons 135. The output of the hidden layer 120 is the input of the output layer 130. In an embodiment where a plurality of hidden layers is implemented, the output of the final hidden layer is used as the input to the output layer 130. In some embodiments, the output neurons 135 of the output layer 130 may provide a result to an output numerical translator matrix 106, which is configured to translate the output of the output layer 130 from a numerical representation to an output. For example, the translation matrix 106 may translate a binary output comprised of ones and zeros to an alphanumeric string.

In an embodiment where a CNN is utilized, the output layer is realized as a fully connected layer. In certain embodiments, the output layer, and at least another layer preceding the output layer, are fully connected layers.

It should be noted that the neural network discussed with respect to FIG. 1 can be executed over, or realized by, a general purpose or dedicated hardware. Examples for such hardware include analog or digital neuro-computer realizing any one of a combination of electronic components, optical components, a von-Neumann multiprocessor, a graphical processing unit (GPU), a general purpose GPU (GPGPU), a vector processor, an array processor, a tensor processing unit, a combination thereof, and the like.

Figure 2:
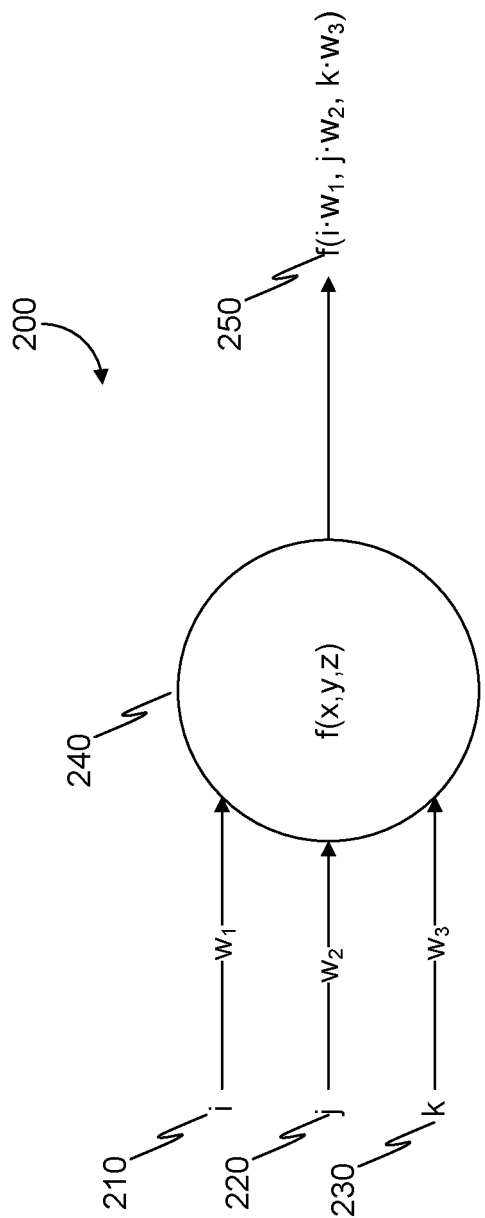
FIG. 2 is a diagram of a node of a neural network having multiple inputs and an output, implemented in accordance with an embodiment.

FIG. 2 is an example of a diagram 200 of a node of a neural network having multiple inputs and an output, implemented in accordance with an embodiment. A node 240 receives at least an input, in this example, the node 240 receives a first input (i) 210, a second input (j) 220 and a third input (k) 230. Each input is assigned a corresponding weight value, such that the first input (i) 210 has a weight $w_1$, the second input (j) 220 has a weight $w_2$, and the third input (k) 230 has a weight $w_3$. The node executes a function f(x,y,z) which generates an output 250, which is equal to f(i·w1, j·w2, k·w3). In certain embodiments the function f(x,y,z) may be computationally expensive relative to the cost of storing a cached result for certain inputs. The process of storing outputs of a computationally expensive function for given inputs is known as memoization. Memoization is a process to decrease overall computation time in exchange for memory space.

In this example, if there are frequent occurrences of inputs which result in likewise recurring outputs, computation may be reduced (i.e., use of less resources) or made faster (using the same resources to get a faster result) by caching the output for given inputs. The input-output pairing may be stored in a lookup table, such that looking up the value for a given input(s) will result in an output, if one exists (i.e., cache hit). If an output does not exist, the output may be stored in the cache. In an embodiment, memoization techniques populate a cache in run time, rather than in advance. In certain embodiments, it is advantageous to provide at least a portion of precomputed functions to populate the cache, to increase the chance of initial cache hits. For example, in certain embodiments input-output pairs (e.g., pairs including an input value and an output value, a plurality of each, and the like) are detected which are utilized with a frequency above a predetermined threshold. In an embodiment, the input-output pairs are preloaded into a value cache. In certain embodiments, the input-output pairs which are preloaded are stored in a value cache which applies an eviction policy only to input-output pairs which are not the preloaded input-output pairs.

In an embodiment, the output 250 requires performing three multiplications and two additions. Arithmetic operations (e.g., multiplication and addition) are performed, in an embodiment, by an arithmetic logic unit (ALU). An ALU is an electronic circuit which performs arithmetic and bitwise operations on integer binary numbers. It is recognized that such ALUs require less power when performing, for example, addition than when performing multiplication. There are certain caveats to this, for example when the multiplication is with a number which is a power of two (i.e., $2^x$, where 'X' is an integer) the multiplication operation can be replaced by a shift operation (e.g., using a shift register). In an embodiment, the inputs are used to determine if an input-output should be stored in a value cache.

For example, where an input causing a multiplication involves a power of two, the input is not a good candidate for storing in the value cache, as the multiplication operation can be replaced by a shift operation. In certain embodiments, inputs having a value close to two may also be determined to not be good candidates for storing in a value cache. For example, if the first input 210 is 5 and the weight $w_1$ is 17, the multiplication between the two digits can be replaced by 5 multiplied by (16+1). The binary value representing 5 would be shifted 4 places (as $2^4=16$), to the result of which another 5 would be added, thus replacing a multiplication operation with a shift operation and an addition operation. In certain embodiments, a check is performed to determine if a weight represents a value which, when multiplied, can be converted from a multiplication operation to a shift operation. In certain embodiments, the check is further performed to determine if a weight value can be converted from a multiplication operation to a shift operation, and a predetermined number of addition operations.

In an embodiment, a power consumption is determined for a value cache read operation. A value cache read operation requires power in order to retrieve a value from the cache. It is desirable, in an embodiment, that the power required by the value cache read operation be lower than the power required to perform a multiplication operation, an addition operation, a shift operation, and a combination thereof. In certain embodiments a check is performed for each potential cache insertion operation to determine a power consumption of performing the operation, and comparing the determined power consumption to a predetermined value of cache lookup power consumption. In an embodiment, a potential cache insertion is inserted into cache if input values exceed a frequency threshold (e.g., the inputs appear together a number of times exceeding a threshold) and also the power consumption of performing a computation using the inputs is below the power consumption of performing a lookup from the value cache.

Figure 3:
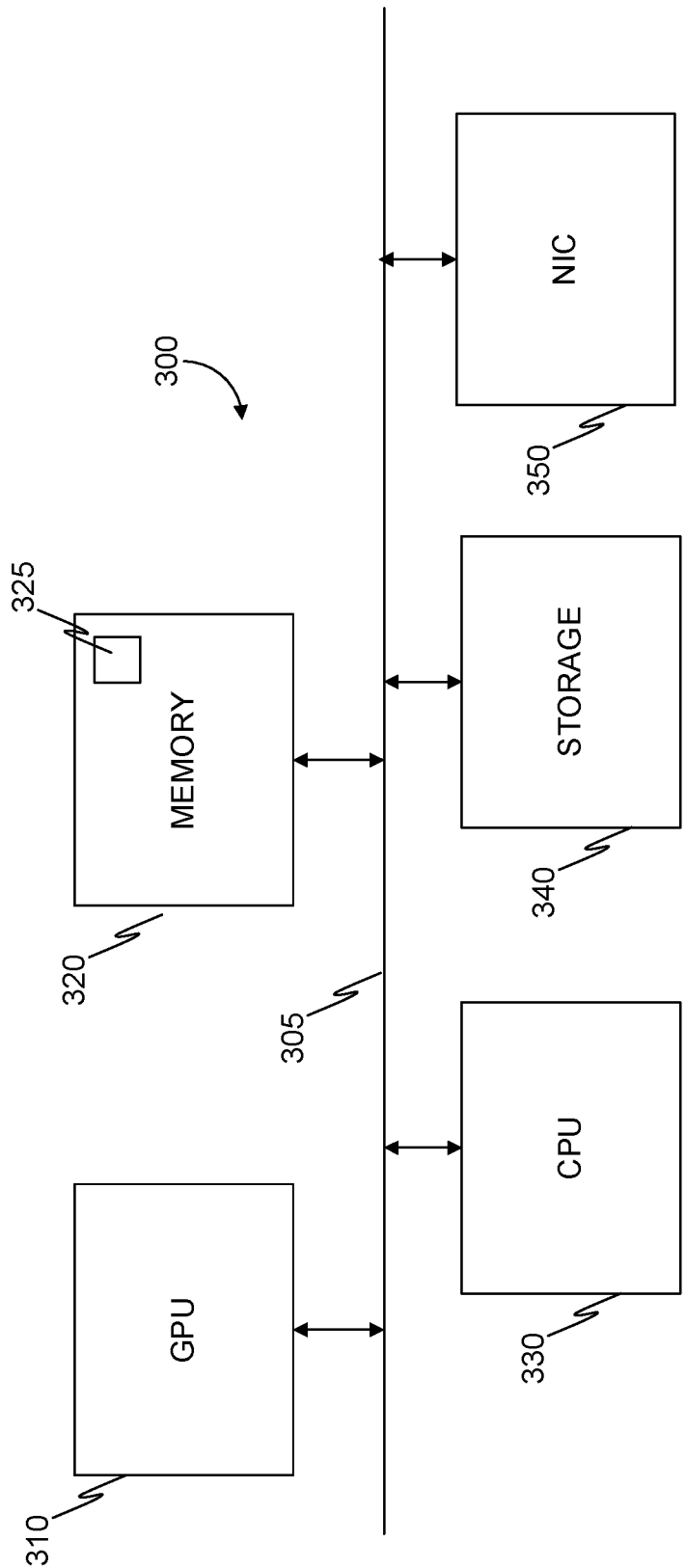
FIG. 3 is a schematic diagram of a neural network processing system according to an embodiment.

FIG. 3 is an example schematic diagram of a neural network processing system 300 according to an embodiment. The system 300 includes a parallel processing circuitry 310 and a serial processing circuitry 330, coupled to a memory 320, a storage 340, and a network interface 350. In an embodiment, the components of the system 300 may be communicatively connected via a bus 305.

The parallel processing circuitry 310 may be realized as one or more hardware logic components and circuits. For example, and without limitation, illustrative types of hardware logic components that can be used include graphics processing units (GPUs), general purpose GPUs (GPGPUs), and tensor processing units (TPUs).

The serial processing circuitry 330 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., random access memory, etc.), non-volatile (e.g., read only memory, flash memory, etc.), or a combination thereof. In an embodiment the memory 320 includes memory portion 325 which stores therein a neural network model, such as the one described in more detail above with respect to FIG. 1.

In one configuration, software for implementing one or more embodiments disclosed herein may be stored in the storage 340. In another configuration, the memory 320 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the parallel processing circuitry 310, the serial processing circuitry 330, or a combination thereof, cause the parallel processing circuitry 310, the serial processing circuitry 330, or a combination thereof, to perform the various processes described herein.

The storage 340 may be magnetic storage, optical storage, solid state storage, and the like, and may be realized, for example, as flash memory or other memory technology, or any other medium which can be used to store the desired information.

The network interface 350 allows the system 300 to communicate with a network (not shown).

It should be understood that the embodiments described herein are not limited to the specific architecture illustrated in FIG. 3, and other architectures may be equally used without departing from the scope of the disclosed embodiments.

Figure 4:
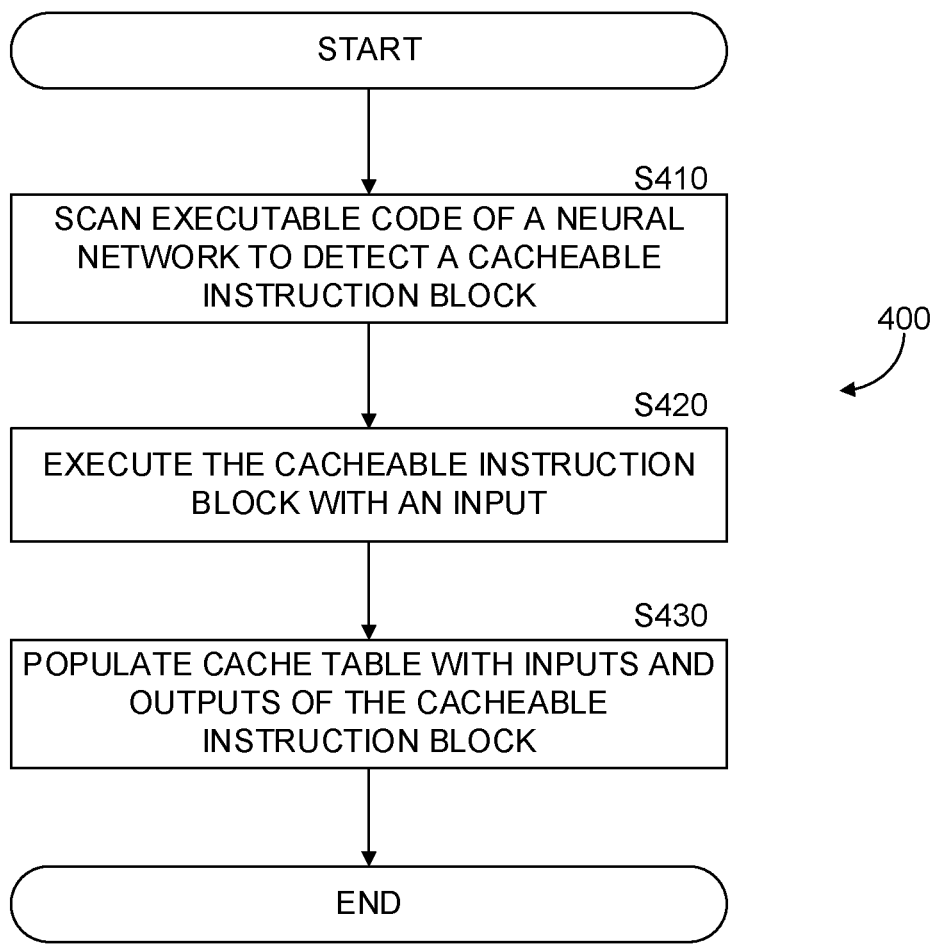
FIG. 4 is a flowchart of a method for utilizing memoization for processing a neural network model, implemented in accordance with an embodiment.

FIG. 4 is an example flowchart 400 of a method for utilizing memoization for processing a neural network model, implemented in accordance with an embodiment. In certain embodiments, the method is utilized on a convolutional neural network.

At S410, source code of a neural network model is scanned to find at least a cacheable instruction block. In an embodiment, scanning may be performed by an instruction parser. In certain embodiments the instruction parser is part of a compiler toolchain. In other embodiments a stand-alone instruction parser is configured to perform scanning for a cacheable instruction block. In certain embodiments the instruction parser performs syntactic analysis of the source code and generates a syntax tree of the source code and generates basic blocks of the source code (i.e., instruction block). In an embodiment, a basic instruction block is a portion of code having predefined input and output parameters, meaning the basic instruction block must not include control-like instructions, such as for example an if statement, a branch, or a "go-to" statement.

In some embodiments, scanning of the executable code (i.e., object code) is performed by a binary instrumentation tool. In other embodiments scanning may be performed by utilizing a just-in-time environment to scan a target executing program and accordingly modify its executable code. Furthermore, in certain embodiments scanning is performed at the intermediate code level, at decompiled code level, or other form of executable code.

In an embodiment the cacheable instruction block is generated at compile time for execution on a processor, such as a general purpose graphics processing unit (GPGPU). In an embodiment, the executable code is generated by a CPU, GPGPU, a combination thereof, and the like. A cacheable instruction block is a block of instructions which include an input and an output, such that the input and output are local to the block of instructions. An instruction block having a local input and a local output cannot call other functions for input outside of the instruction block.

At S420, the cacheable instruction block is executed on an input. In an embodiment, the cacheable instruction block is executed with multiple different inputs, each resulting in a corresponding output. In certain embodiments the cacheable instruction block includes instructions corresponding to a single node (i.e., function) of a neural network. In some embodiments the cacheable instruction block includes instructions corresponding to a plurality of nodes. In an embodiment, the plurality of nodes are each in the same layer. For example, the plurality of nodes are each in a convolutional layer of a convolutional neural network (CNN). In certain embodiments a first group of the plurality of nodes are associated with a first layer of a neural network, and a second group of the plurality of nodes are associated with a second layer of the neural network, where the second layer is consecutive to the first layer. In some embodiments the cacheable instruction block includes instructions corresponding to a subset of the instructions of a node e.g., only a part of the instruction of a function formulates a cacheable instruction block.

In an embodiment, a cacheable instruction block is determined to be cacheable by determining a power consumption required by a processing circuitry to perform a computation based on the instruction block. In an embodiment the cacheable instruction block is a potential cache insertion until it is determined that executing the cacheable instruction by the processing circuitry requires more power than retrieving a result of executing the cacheable instruction block from a value cache.

At S430, a cache is populated with an input and output of the cacheable instruction block. In certain embodiments, an input-output pair includes a plurality of inputs, a plurality of outputs, and a combination thereof. In an embodiment, population of the cache occurs in run time, after the executable code is compiled. In an embodiment, the cache includes an eviction policy. An eviction policy clears the cache of stored values, for example in order to make room for more frequently used values. Eviction policies may be, for example least recently used (LRU), FIFO (First In, First Out), combinations thereof and the like.

In some embodiments, similar inputs may result in substantially similar outputs. In certain embodiments, populating the cache further includes: comparing a first input to a second input while ignoring the least significant bit of the input, comparing a first output to a second output ignoring the least significant bit (LSB), combinations thereof, and the like.

For example, if a first binary input '10001000' results in a first binary output '100010' and a second binary input '10001001' results in a second binary output '100011', the cache is populated by assigning an input having a value of '1000100_', where '_' signifies the LSB, and an output defined as '100011' (the second binary output). This increases the probability of a cache hit occurring, which is desirable as frequent cache hits result in reduced use of processing circuitries which translates to a reduction in power consumption. This is beneficial, for example in CNNs which are used for image processing, as this takes advantage of images, as inputs, having value locality (i.e., pixels proximate to each other are similar in value). In an embodiment, similarity is determined, for example, by a predetermined number of LSBs. In certain embodiments, the predetermined number of LSBs is different for different layers of the neural network model. For example, in a first layer two values are considered similar if they differ by one LSB, and in a second, consecutive, layer two values are considered similar if they differ by two LSBs. In certain embodiments, a number of LSBs is determined by the length of the input. In some embodiments, the number of LSBs is determined by a ratio between the number of LSBs to the total length of the input. In an embodiment, the ratio between the number of LSBs to the total length of the input is one LSB to every eight bits. For example, if the total length of the input is ten bits, the number of LSBs is one, if the total length of the input is sixteen bits, the number of LSBs is two.

In an embodiment similarity between a first input and a second input, between a first output and a second output, and a combination thereof, is further determined based on a length of the input, a length of the output, a combination thereof, and a number of LSBs. For example, if the length of the input is 8 bits, and the number of LSBs is equal to 1, inputs may be considered similar if they differ from each other by one bit (the LSB). In certain embodiments, the length of the input (or output) and the number of LSBs may be taken into account when determining similarity. For example, if the input length is 4 bits, an LSB length equal to 2 may result in outputs which are wildly different resulting in errors which are unacceptable, or yield meaningless results. However if the input length is 16 bits, then an LSB length of 2 bits is acceptable, in an embodiment.

In some embodiments, the number of bits that can be ignored from the inputs (i.e., the LSBs) are determined, guided, and the like, by an circuitry external to the processing circuitry, that is configured to calculate the number of bits for each node, for each layer of nodes, and the like, based on a profiling analysis.

Figure 5:
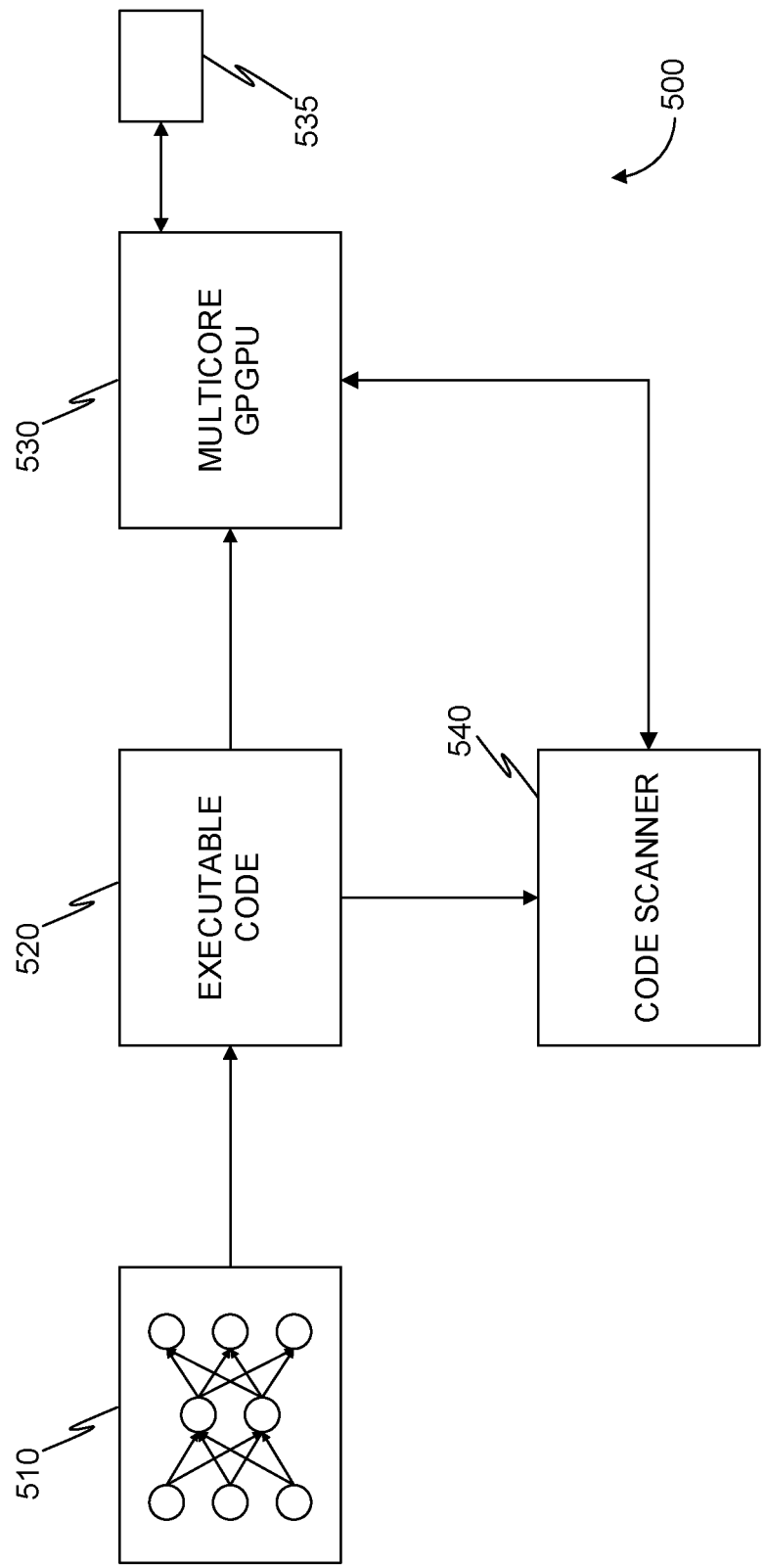
FIG. 5 is a diagram of a neural network processing system, implemented in accordance with an embodiment.

FIG. 5 is an example diagram of a neural network processing system 500, implemented in accordance with an embodiment. Executable code 520 is generated from a neural network model 510 which is initialized using some known input values. In an embodiment the executable code 520 is generated by the processing circuitry described with respect to FIG. 3 above. In certain embodiments the executable code 520 is provided to a code scanner 540 and a processing circuitry, such as a central processing unit (CPU), digital signal processor (DSP), Field Programmable Gate Array (FPGA), or multicore GPGPU 530. In certain embodiments, the executable code 520 is provided to a parallel processor, for example such as described above in FIG. 3. In an embodiment the multicore GPGPU 530 is connected with a memory 535, which is used as a memoization cache. In an embodiment the memory 535 utilizes the techniques disclosed herein.

In an embodiment, a code scanner 540 is configured to receive the executable code 520, and is further configured to determine if there are cacheable instruction blocks. The code scanner 540 is configured, in an embodiment, to implement the methods described herein. In an embodiment, the code scanner 540 is further configured to determine similarity between inputs, between outputs, between input-output pairings, and any combination thereof, to determine if the inputs, outputs, input-output pairings, or any combination thereof, can be used to populate a memoization cache in the memory 535. In certain embodiments, the code scanner 540 is implemented as part of the system 300 of FIG. 3.

In some embodiments, the code scanner 540 is configured to receive an input matrix, detect values in a portion of the input matrix, and generate a new input matrix based on adjusted values of the portion of the input matrix. A method for generating a new input matrix is discussed in more detail below. Adjusting values of the input matrix improves processing of the matrix input, in an embodiment. For example, where the input matrix is a tensor which serves as an input for a CNN, adjusting the input values increases the probability of having a cache hit, thereby reducing processing needed to be performed by a processing circuitry.

Figure 6:
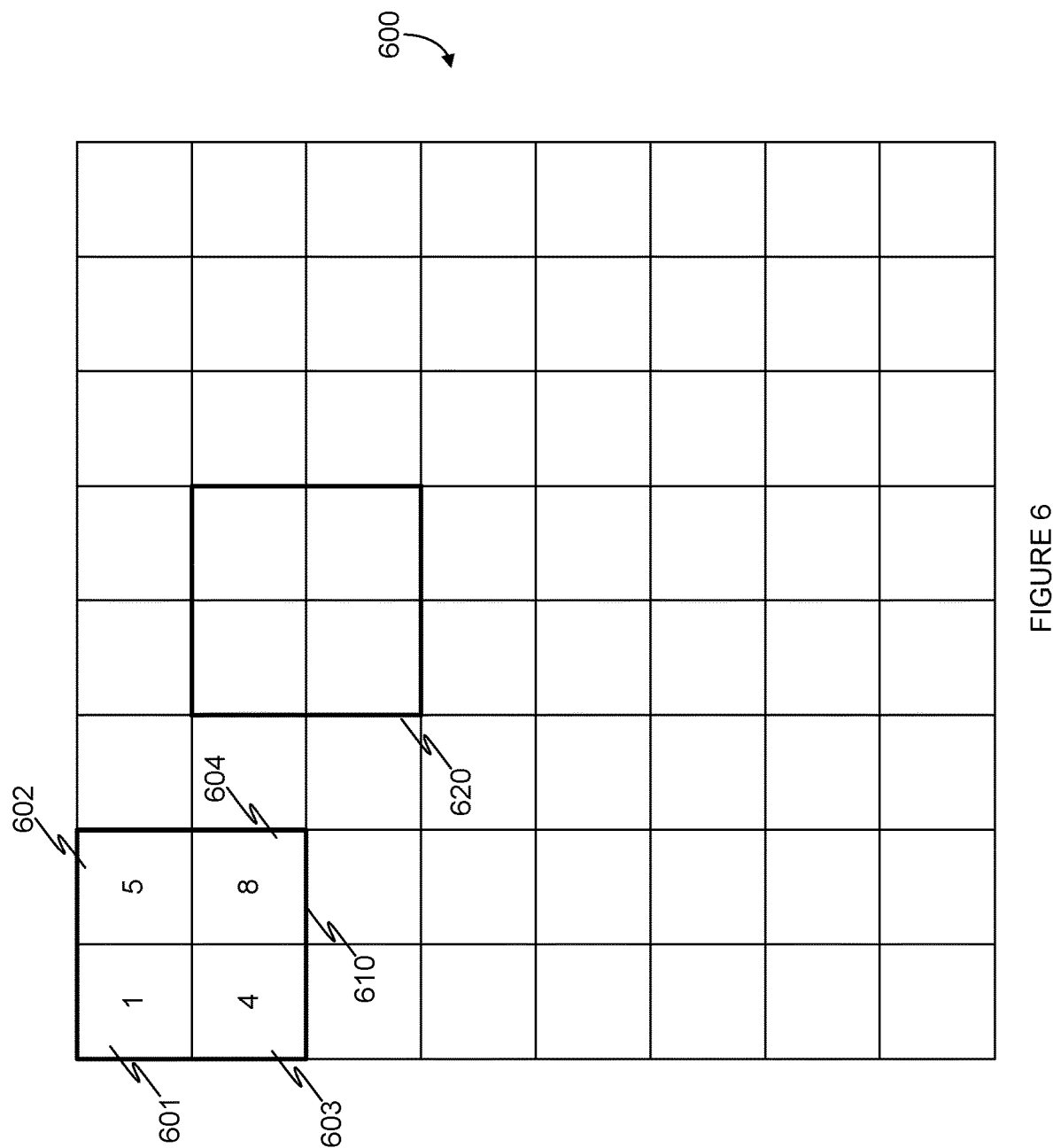
FIG. 6 is a diagram of an input matrix for processing on a parallel processing circuitry utilizing memoization, utilized to describe an embodiment.

FIG. 6 is an example diagram of an input matrix for processing on a parallel processing circuitry utilizing memoization, utilized to describe an embodiment. An example method of processing an input matrix 600 according to an embodiment is discussed in more detail in FIG. 7 below.

An input matrix 600 includes a plurality of values. In an embodiment, the input matrix 600 is a tensor. In some embodiments, the input matrix 600 is an input for a convolutional neural network (CNN). In certain embodiment, the input matrix 600 is a kernel, a fully connected layer, and the like. For example, the input matrix 600 is a kernel of a CNN, in an embodiment. In some embodiments, the input matrix 600 includes values which are stored as binary values.

The input matrix 600 represents, for example, an image, portion of an image, and the like in an embodiment. In some embodiments, the input matrix 600 is a convolution between a representation of an image and a matrix of weight values (i.e., kernel). Images are represented, in an embodiment, as matrices having stored for each pixel of the image at least a value. For example, in an embodiment an image is represented by three matrices, each corresponding to a color channel (i.e., Red, Green, and Blue). Each value is representative of an intensity with which the color is presented at a specific pixel.

In an embodiment the input matrix 600 is utilized in a convolution with another matrix by a processing circuitry, for example representing weights of the CNN, an activation map, and the like. A convolution involves a multiplication between matrices, for example processing a dot product, and is therefore a computationally expensive function to perform in terms of processing resources.

It is desirable to reduce such processing use in order to reduce power use by a device, increase calculation speed, and the like. For example, certain multiplication operations can be replaced with addition functions by manipulating the input provided to the operation. In some embodiments, utilizing a memoization value cache further reduces processor use, thereby improving efficiency of a computer processor device.

In certain embodiments, the input matrix 600 includes a plurality of portions, such as first portion 610 and second portion 620. In an embodiment, a portion is diagonal, or off-diagonal. For example, the first portion 610 is a diagonal portion, as the values which are diagonal of the first portion 610 are all diagonal values of the input matrix 600. In the same vein, the second portion 620 is an off-diagonal portion, as the diagonal values of the second portion 620 are not diagonal values of the input matrix 600.

In an embodiment, the first portion 610 is a two-by-two matrix having a first value 601, a second value 602, a third value 603, and a fourth value 604. In some embodiments a matrix portion is an 'N' by 'N' matrix, where 'N' is a natural number having a value greater than '1'. In an embodiment, the first value 601 and the fourth value 604 are diagonal values of the first portion 610, and are also diagonal values of the input matrix 600.

In an embodiment, a check is performed to determine if values are proximate to each other within a determined threshold. For example, the first value 601 has a value of '1' and the fourth value 604 has a value of '8', which are not within the predetermined threshold of +/−1. In some embodiments, a value is determined to be proximate to another value based on a number of LSBs, for example as discussed in more detail above. For example, if two values, represented in binary, are identical other than two LSBs, the values are considered proximate, in an embodiment. In certain embodiments, a value proximate to another value is adjusted to be identical to the another value.

In certain embodiments, a value of a pixel is checked against all values of neighboring pixels in a portion. For example, the second value 602, the third value 603, and the fourth value 604 are each compared to the first value 601, in an embodiment, to determine if the values are within a threshold value of each other. In some embodiments, comparison is performed by a comparator circuit.

Comparing values of neighboring weights and adjusting neighboring weight values is advantageous, in an embodiment, as this allows to take advantage of value locality in an image. Value locality occurs due to images often having local values which are close, if not identical, in value, due to the inherent quality that in an image, hundreds, thousands, or more, pixels are used to store information about objects that are relatively uniform in color.

For example, a picture of an apple will have large portions of the image where pixels have relatively close values corresponding to different shades of red. In some embodiments, the proximity of these values paired with weights which are adjusted to be identical increases the probability of having an input-output value cache hit. As a straightforward example, two pixels have an identical value, and a dot product (or convolution) is generated between the two pixels and two weights which were adjusted to have the same value, results in performing the same processing twice (i.e., once for the first pixel with the first weight, and once for the second pixel with the second weight). For the second processing, there is no need to process the pixel value and weight value again as the previous result, if stored in a value cache, can be retrieved, thereby reducing overall processing.

For example, the second value 602 has a value of '5' and the third value 603 has a value of '4', which is within the predetermined threshold. In an embodiment, the second value 602 is adjusted to the value of the third value 603 (i.e., both are adjusted to '4'). In another embodiment, the third value 603 is adjusted to value of the second value (i.e., both are adjusted to '5'). In some embodiments, adjusting a value of a matrix portion includes generating a new matrix based on the input matrix and an adjusted value.

In certain embodiments, a z-buffer depth test is performed on values of an input matrix portion. For example, a z-buffer depth test result is used to determine a threshold value. The threshold value is used, in an embodiment, in determining if two values are close enough to each other to be adjusted. In some embodiments, the adjusted values are adjusted to a third value, which is not any of the values. In the example of the third value 603 and the second value 602, the third value may be, for example, '6'. In some embodiments, the third value is determined by selecting a value between, for example, the second value 602 and the third value 603. For example, the third value is the average of two values, in an embodiment.

Figure 7:
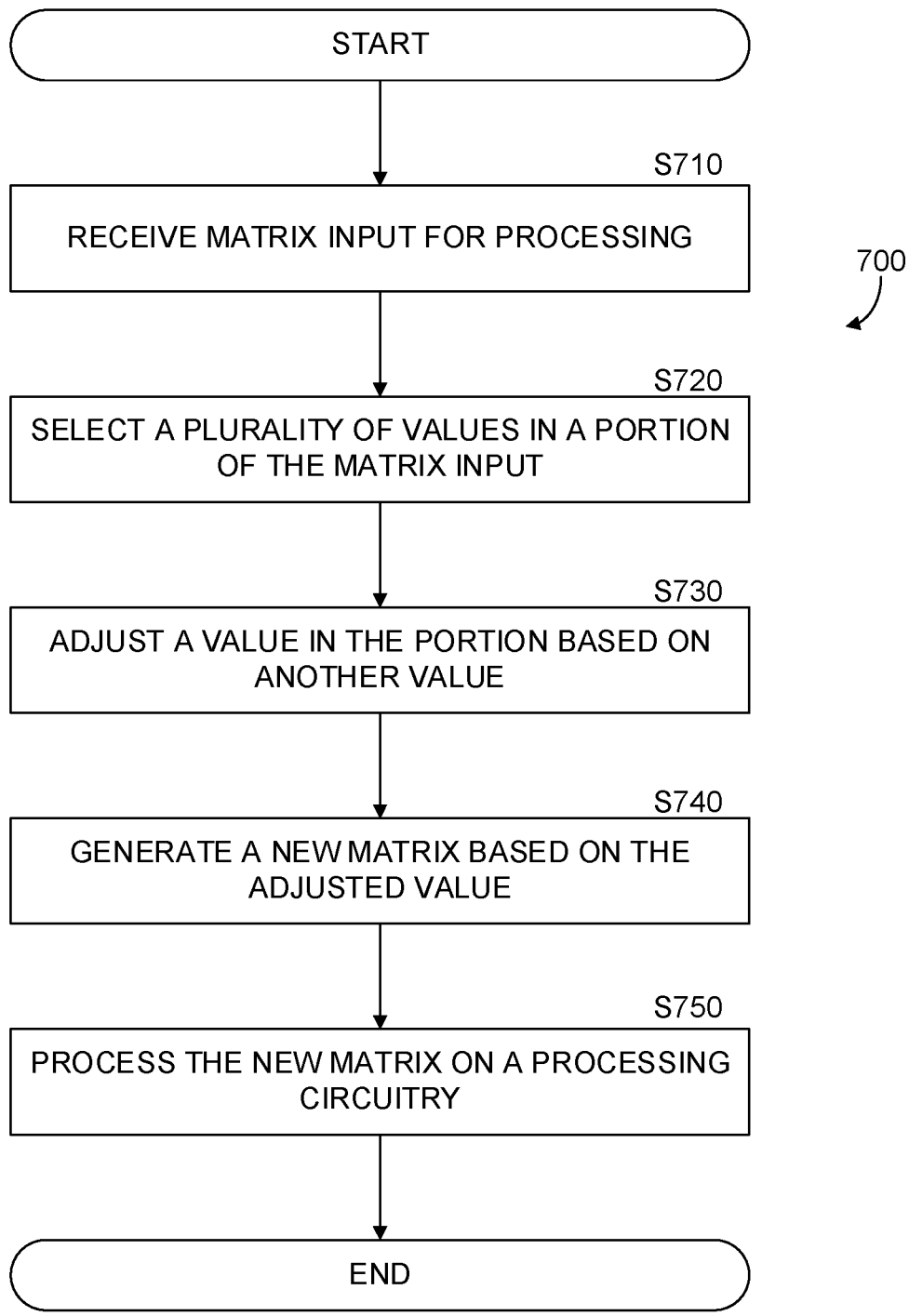
FIG. 7 is a flowchart of a method for increasing value cache hits utilizing memoization techniques, implemented in accordance with an embodiment.

FIG. 7 is an example flowchart 700 of a method for increasing value cache hits utilizing memoization techniques, implemented in accordance with an embodiment. Increasing value cache hits is desirable as each time a value is read from a cache, power consumption of a processing circuitry is reduced by not executing a computationally expensive instruction, from a power consumption perspective.

At S710, an input matrix is received. In an embodiment, the input matrix is a tensor. In certain embodiments, the input matrix represents an image, series of images, an activation map, a convolution layer, a fully connected layer, and the like. The input matrix is an input for a parallel processing application, such as a neural network, in an embodiment. For example, in an embodiment the neural network is a convolutional neural network (CNN). In some embodiments, the CNN includes a plurality of convolutional layers. The CNN, when processed on a processing circuitry, configures the processing circuitry to receive the input matrix as an input, and process the input matrix with a convolutional layer, in an embodiment.

A convolutional layer is, in an embodiment, a kernel, a mask, and the like. In certain embodiments, a first kernel is applied to a first portion of the input matrix, and a second kernel is applied to a second portion of the input matrix. In an embodiment a kernel is applied to each portion of the input matrix. In some embodiments, the convolutional layer is a matrix having a size which is equal to, greater than, or less than, a size of the input matrix. In certain embodiments, the input matrix represents a tile of an image.

At S720, a portion of the input matrix is selected. In an embodiment, the input matrix includes a plurality of portions, each portion including a plurality of values, each value corresponding to a pixel. In certain embodiments, a portion of the input matrix represents a tile. In some embodiments, a plurality of portions are selected. In certain embodiments, a first portion of the input matrix and a second portion of the input matrix include an overlapping value of the input matrix.

At S730, a value of the portion of the input matrix is adjusted. In an embodiment, a first value of the portion is compared to a second value of the portion. For example, where the first value and the second value are close to each other (e.g., within a threshold) the first value is adjusted based on the second value, according to an embodiment. In an embodiment, a first value and a second value are determined to be close to each other (or proximate to each other) when the first value and the second value are identical in all but a number of LSBs. In some embodiments, the number of LSBs is determined dynamically. For example, the number of LSBs is one LSB for a first period of time (or number of executions), and three LSBs for a second period of time (or another number of executions), according to an embodiment.

In an embodiment, a z-buffer test is performed on the portion of the input matrix to determine a threshold value. The threshold value is utilized, in an embodiment, to determine if a first value and a second value are within the threshold value to each other. Where the first value and the second value are within the threshold value, the first value, the second value, or both the first value and the second value, are adjusted, in an embodiment.

In certain embodiments, adjusting a value includes changing the value of a pixel from a first value to a second value. By adjusting the values in an input matrix the likelihood of multiple cache hits for a value cache utilized in memoization is increased, as the number of identical inputs is statistically increased. Due to the property of locality in image data, there is an increased probability that two neighboring weights having a same value will be applied to two neighboring pixels also having a same value.

In some embodiments, a third value is determined based on the first value and the second value. For example, the third value is an average of the first value and the second value, in an embodiment. In certain embodiments, the average value is rounded to the closest integer.

In certain embodiments, a plurality of portions include adjusted values. In some embodiments, a first portion includes an adjusted value, and a second portion of the input matrix does not include an adjusted portion.

In some embodiments, a first group of values of the input matrix portion are adjusted based on a first value, and a second group of values of the input matrix portion are adjusted based on a second value.

At S740, a new input matrix is generated. In an embodiment, the new input matrix is generated based on the adjusted values. In some embodiments the new input matrix includes a group of portions, tiles, and the like, at least some of which include an adjusted value.

At S750, the new input matrix is processed. In an embodiment, the new input matrix is processed instead of the input matrix. In some embodiments, processing the new input matrix includes generating an instruction for a processing circuitry to perform a convolution between the new input matrix and a kernel, convolution layer, filter, and the like.

The new input matrix includes more identical values when compared to the input matrix as received, which increases the probability of storing in a value cache values which are likely to generate multiple hits. Where a system has less different values, there is an increased probability of any particular value being selected. This is desired as the more values which are retrieved from a cache, the less resources a system needs to devote to a processing circuitry, for example in terms of power consumption.

In an embodiment, the method includes retraining of the convolutional neural network by adjusting a plurality of weights (i.e., values), such that a first weight value is adjusted based on proximity to a neighboring weight value, and a second weight value is adjusted based on, for example, a target function used to train the convolutional neural network.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for increasing cache hits in a value cache utilizing memoization, comprising:
   receiving an input matrix for a parallel processing circuitry, wherein the parallel processing circuitry configured to process the input matrix with a second matrix;
   selecting a portion of the input matrix, wherein the portion includes a plurality of values;
   adjusting a first value of the plurality of values based on a second value of the plurality of values;
   generating a new input matrix based on the input matrix and the adjusted first value; and
   configuring the parallel processing circuitry to process the new input matrix with the second matrix.

2. The method of claim 1, further comprising:
   determining a threshold value for comparing the first value to the second value.

3. The method of claim 2, further comprising:
   adjusting the first value of the plurality of values in response to determining that the second value of the plurality of values is within the determined threshold value from the first value.

4. The method of claim 2, further comprising:
   determining the threshold value based on a number of least significant bits (LSBs).

5. The method of claim 1, further comprising:
   adjusting a third value of the plurality of values based on a target function of a neural network.

6. The method of claim 1, further comprising:
   adjusting the first value of the plurality of values to the second value of the plurality of values.

7. The method of claim 1, further comprising:
   performing a z-buffer depth test on the plurality of values; and
   generating a threshold value for the portion of the input matrix based on a result of the z-buffer depth test.

8. The method of claim 7, further comprising:
   adjusting the first value of the plurality of values in response to determining that the second value of the plurality of values is within the generated threshold value from the first value.

9. The method of claim 1, wherein the input matrix is a kernel of a convolutional neural network (CNN).

10. The method of claim 1, wherein the portion overlaps with a second portion, such that a value of the portion is also a value of the second portion.

11. The method of claim 1, wherein the second matrix is any one of: a representation of an image, a fully connected layer of a CNN, and a convolutional layer of a CNN.

12. A non-transitory computer readable medium having stored thereon instructions for causing a processing circuitry to execute a process, the process comprising:
receiving an input matrix for a parallel processing circuitry, wherein the parallel processing circuitry configured to process the input matrix with a second matrix;
selecting a portion of the input matrix, wherein the portion includes a plurality of values;
adjusting a first value of the plurality of values based on a second value of the plurality of values;
generating a new input matrix based on the input matrix and the adjusted first value; and
configuring the parallel processing circuitry to process the new input matrix with the second matrix.

13. A system for increasing cache hits in a value cache utilizing memoization, comprising:
a processing circuitry; and
a memory, the memory containing instructions that, when executed by the processing circuitry, configure the system to:
receive an input matrix for a parallel processing circuitry, wherein the parallel processing circuitry configured to process the input matrix with a second matrix;
select a portion of the input matrix, wherein the portion includes a plurality of values;
adjust a first value of the plurality of values based on a second value of the plurality of values;
generate a new input matrix based on the input matrix and the adjusted first value; and
configure the parallel processing circuitry to process the new input matrix with the second matrix.

14. The system of claim 13, wherein the memory contains further instructions which when executed by the processing circuitry further configure the system to:
determine a threshold value for comparing the first value to the second value.

15. The system of claim 14, wherein the memory contains further instructions which when executed by the processing circuitry further configure the system to:
adjust the first value of the plurality of values in response to determining that the second value of the plurality of values is within the determined threshold value from the first value.

16. The system of claim 14, wherein the memory contains further instructions which when executed by the processing circuitry further configure the system to:
determine the threshold value based on a number of least significant bits (LSBs).

17. The system of claim 13, wherein the memory contains further instructions which when executed by the processing circuitry further configure the system to:
adjust a third value of the plurality of values based on a target function of a neural network.

18. The system of claim 13, wherein the memory contains further instructions which when executed by the processing circuitry further configure the system to:
adjust the first value of the plurality of values to the second value of the plurality of values.

19. The system of claim 13, wherein the memory contains further instructions which when executed by the processing circuitry further configure the system to:
perform a z-buffer depth test on the plurality of values; and
generate a threshold value for the portion of the input matrix based on a result of the z-buffer depth test.

20. The system of claim 19, wherein the memory contains further instructions which when executed by the processing circuitry further configure the system to:
adjust the first value of the plurality of values in response to determining that the second value of the plurality of values is within the generated threshold value from the first value.

21. The system of claim 13, wherein the input matrix is a kernel of a convolutional neural network (CNN).

22. The system of claim 13, wherein the portion overlaps with a second portion, such that a value of the portion is also a value of the second portion.

23. The system of claim 13, wherein the second matrix is any one of: a representation of an image, a fully connected layer of a CNN, and a convolutional layer of a CNN.

* * * * *